Jan. 11, 1955  H. BECKER  2,699,035
ORNAMENTAL CHAIN FOR BRACELETS AND THE LIKE
Filed Oct. 17, 1949
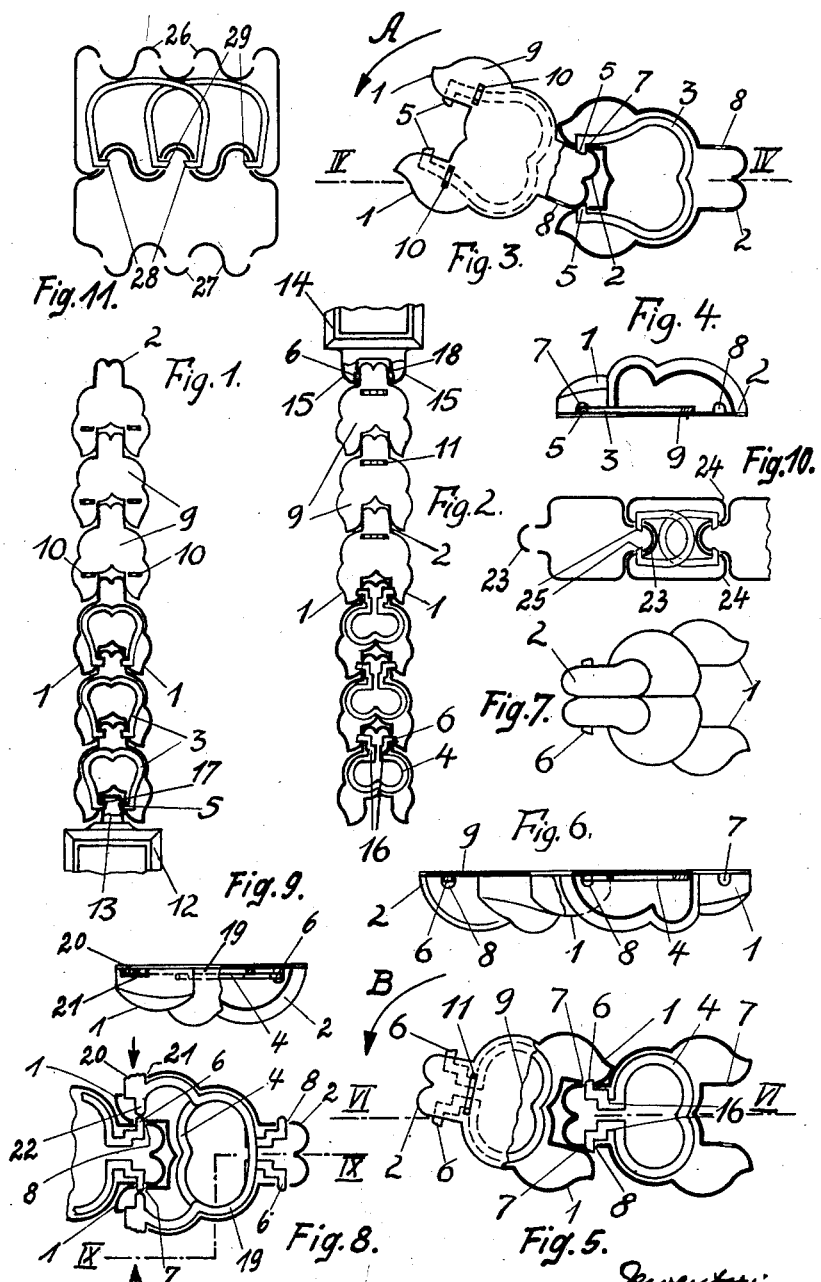

United States Patent Office 2,699,035
Patented Jan. 11, 1955

2,699,035

ORNAMENTAL CHAIN FOR BRACELETS AND THE LIKE

Hermann Becker, Dietlingen, Kreis Pforzheim, Germany

Application October 17, 1949, Serial No. 121,743

1 Claim. (Cl. 59—80)

The present invention relates to ornamental strip-bodies, such as are used in the manufacture of bracelets, wrist-watch strips, necklaces and the like, and is particularly directed to novel means for fastening the individual links of such strip-bodies together in a reliable and satisfactory way.

In known strip-bodies of this kind the individual links are secured together by link-pins or by so-called "Rouleau" connecting means. However, the link-pins, although covered up in the beginning by the galvanic coating, soon become visible at the sides of the strip and destroy the sightly appearance of the latter. The "Rouleaux" connections, on the other hand, are connecting means for which special coupling members are required and for that reason frequently do not fit into the ornamental picture to be created. Apart from the fact that in both of these cases the coupling means are visible to the eye, there is the other disadvantage that strips of these types can be lengthened or shortened, through addition or removal of links, only by an expert provided with the tools required for the purpose.

The invention, therefore, has for its object to overcome the aforesaid drawbacks.

According to the invention the links of the strip-bodies are provided with tooth-like projections, hereinafter called "teeth," designed for interlocking engagement with the tooth or teeth of the adjacent link. The links are further equipped with holes in said teeth at the places where the side-walls of interlocked teeth are facing each other, and with resilient fastening members adapted to couple the links together by means of said holes in said teeth, whereby said fastening members are so arranged in the links that of two tooth-holes facing each other always one is provided with a fastening member, which extends through said hole and which, when the teeth of two adjacent links are moved into coupling engagement with each other automatically slips into the other vacant tooth-hole.

An embodiment of the invention may be so devised that every link of the strip is provided at one end with two teeth equipped with a pair of holes in the two side-walls of the teeth which are facing each other, and at the opposite end with one single tooth having a pair of holes in the two side-walls of that tooth, and that at every link a pair of resilient fastening members project from either one or the other of those two pairs of holes, which fastening members will then, when the teeth of adjacent links are pushed into coupling engagement with each other, slip into the pair of vacant holes of the other link.

In a construction of the aforesaid type there are two ways of arranging the resilient fastening members in the links. One possibilty is to make the two fastening members project from the pair of holes in the two side-walls of the teeth which are facing each other, and the other possibility is to make them extend through the pair of holes in the two side-walls of the single tooth. In the first case the fastening members will slip, during the coupling operation, into the vacant pair of holes in the two side-walls of the single tooth, while in the second case the fastening members will slip into the vacant pair of holes in the two side-walls of the teeth which are facing each other.

The resiliency or snap-action of the fastening members may be achieved through arrangement in the hollow interior of the links of bail-like springs, which with their outwardly turned end portions form the aforesaid fastening members, whereby these springs may be so devised and so positioned in the links that the resilient end portions of the springs project from the links either through the pair of holes in the two side-walls of the teeth which are facing each other, or through the pair of holes in the two side-walls of the single tooth. It will be noted that the lower portions of the springs seat against the outer side walls of their links as in Fig. 1, and against the inner intermediate wall of their links as in Fig. 2, whereby the interior link walls provide fixed abutments for the body portions of the links to resist separating movement of the resilient end portions of the springs from their associate holes.

The bail-like springs may be arranged in the interior of the links in such a way that access can be gained from the back of the links to the arms of the springs near the places where the ends of the spring-arms extend through the holes in the teeth, to thereby provide a possibility to withdraw the end-portions of the spring-arms from their coupling engagement with the adjacent link.

For this purpose the springs may be so arranged in the links that their arms are resting on the bottom of the links beneath transverse slots provided in the bottom of the links in such a way that the spring-arms can be seized with the aid of a needle inserted through said slots, to thereby produce the aforesaid uncoupling displacement of the spring ends.

The invention will best be understood from a consideration of the following detailed description, taken in connection with the accompanying drawings, forming a part of this invention, with the understanding, however, that the invention is not confined to any strict conformity with the showing of the drawings, but may be changed or modified, so long as such changes or modifications mark no material departure from the salient features of the invention as expressed in the appended claims.

In the drawings, in which similar numerals of reference indicate corresponding parts in all of the several figures, Figs. 1 and 2 are rear views of the first and second form of invention, with some of the bottom-plates removed to show the interior of the links, which have been used here to form wrist-watch strips;

Fig. 3 is a rear view of two links of the first form of invention showing how the links are coupled together;

Fig. 4 is a central longitudinal section of a link on line IV—IV of Fig. 3;

Fig. 5 is a rear view of two links of the second form of invention showing the links in coupling position;

Fig. 6 is a central longitudinal section on line VI—VI of Fig. 5;

Fig. 7 is a front view of a link of the second form of invention;

Fig. 8 is a rear view of two links of the third form of invention in which the link on the right has been devised for use as a locking link; the bottom plates having been removed to show the interior of the links;

Fig. 9 is a central longitudinal section on line IX—IX of Fig. 8;

Figs. 10 and 11 are rear views of links of the fourth and fifth form of invention.

All of the ornamental links illustrated in the drawings are hollow bodies produced through pressing, and which in finished condition have their interior closed up and concealed from view by a bottom member or plate. In the three forms of construction shown in Figs. 1 to 9 the outer contours of the pressed hollow link-bodies are alike. But the invention is not limited to this particular form, and any other suitable shape, size and appearance may be given to the links, as illustrated in the modifications of Figs. 10 and 11.

The links shown in Fig. 1 are provided at one end with two tooth-like projections 1, and at the opposite end with one projection 2, and have arranged in their hollow interior a bail-like spring 3 equipped with two inwardly extending fastening members 5, while in the similar construction of Fig. 2 the fastening members 6 of the spring 4 extend in outward direction. According to the form of invention disclosed in Figs. 1, 3 and 4 the fastening members 5 extend through the pair of holes 7 of the teeth 1, 1 of every link and engage in the assembled strip-body in the pair of holes 8 of the single tooth 2 of the adjacent link. On the other hand, in the form of construction illustrated in Figs. 2, 5, 6 and 7 the fastenting members 6 extend through the pair of holes 8 in the single tooth 2 and engage in the assembled strip-body in the pair of holes 7 of the teeth 1, 1 of the next following link.

For covering up the links on their underside and for securing the springs 3 and 4 in their position within the links, the latter are provided with the bottom member or plate 9. According to Fig. 1 the bottom plates 9 have two slot-like openings 10, while in the form of invention illustrated in Fig. 2 the bottom plates 9 are equipped with only one single slot 11. The slots 10 and 11 cross near the place where the links are coupled together, the arms of the springs 3 and 4 arranged beneath them, providing thereby access to the spring-arms of every link from the bottom or underside of the strip.

Figs. 3 and 4 show how the links of the strips illustrated in Figs. 1 and 2 are coupled together.

In Fig. 3 one of the pair of fastening members 5, 5 extending through the pair of holes 7, 7 has already been inserted into a hole 8 of the pair of holes 8, 8 in the tooth 2 of the link on the left. Only a little shifting of the link on the left in the direction indicated by the arrow A is required now to move the link on the left into proper longitudinal alinement with the link on the right. When this is being done the tooth 2 completely enters the space between the teeth 1, 1, whereby the still unoccupied hole 8 of the tooth 2 is forced into contact with the still disengaged fastening member 5, causing the latter to slip into it and thereby establish the linked connection illustrated in Fig. 1.

Separation of the links is effected with the aid of a needle, which for that purpose is inserted into the slot 10 of the bottom plate 9, whereupon the spring-arm behind the needle is pushed backward in such a way that the appertaining fastening member 5 is forced out of the hole 8 of the tooth 2 of the adjacent link. After this has been done the link to be separated is shifted into the position shown on the left side of Fig. 3 and completely uncoupled from the strip.

In Fig. 5 one of the two fastening members 6, 6 projecting from a hole 8 of the single tooth 2 has already been inserted into a hole 7 of the two teeth 1, 1. All that is necessary to couple the links together is a slight rotation of the link on the left in the direction of the arrow B, which will shift the link on the left into correct longitudinal alinement with the link on the right and cause the two teeth 1, 1 of the link on the left to embrace on both sides the tooth 2 of the link on the right with the result that the second fastening member 6 slips into the still unoccupied hole 7 and that the coupling engagement is thereby established. For separating the links, again a needle is used, which is inserted into the bottom-slot 11, whereupon the spring-arm behind the needle is pushed backward, so that the appertaining fastening member 6 is forced out of one of the holes 7 of the two teeth 1, 1 of the adjacent link. The link to be uncoupled is then again in the poistion shown on the left of Fig. 5 and can be removed without difficulty. In order to keep the slot 11, needed for the uncoupling of the fastening members 6, as short as possible, the associated spring 4 has been provided with a neck portion 16 produced through cranking.

The coupling and uncoupling of the last links of the strip-body to the wrist-watches 12 and 14 takes place in a similar way. For this purpose the wrist-watches are equipped with one or two coupling members 13 or 15 provided with openings 17 or 18 for the fastening members 5 or 6 to engage in.

The modification shown in Figs. 8 and 9 is a third form of construction, which may be used as a locking link in combination with the links illustrated in Figs. 2, 5, 6 and 7, if a strip of these links is to be used as a bracelet. This has the advantage that as a locking link for the bracelet a link can be employed which is of a similar type and appearance as the other links, and for that reason will fit more homogeneously into the structure than a locking link of entirely different appearance. But, of course, the link of Figs. 8 and 9 may also be used as an ordinary link in a strip of such links. The pressed body of the locking link is at one end provided with two teeth 1, 1 and at the other end with one tooth 2. Arranged in the interior of the locking link is also a bail-like spring 4, equipped with outwardly extending fastening members 6, projecting through the pair of holes 8 of the single tooth 2, and which in the assembled strip-body engage in a pair of holes 7 of the adjacent link, which is not shown in the figure. In the same way an ordinary link has been coupled to the locking link, on the left side of Fig. 8, by means of the two teeth 1, 1 and the pair of holes 7, 7 in said teeth. In order to perform its function as a locking link, the link has been provided with a second bail-like spring 19, having the ends of its spring-arms positioned in the interior of the two teeth 1, 1 and equipped with fluted press-buttons 20, protruding through a pair of openings 21 provided in the outside of the teeth 1, 1. In addition to the press-buttons 20, the spring 19 is equipped with pressure members 22 positioned behind the press-buttons 20 within the teeth 1, 1 and so arranged and dimensioned that they are in touch with the fastening members 6, 6 of the adjacent link extending through the pair of holes 7 into the teeth 1, 1 of the locking link. When pressure is exerted upon the press-buttons 20 in the directions indicated by the arrows in Fig. 8, the pressure members 22 will force the fastening members 6 out of the pair of holes 7 and thereby uncouple the end of the strip from the locking link.

All of the forms of construction disclosed until now show hollow link-bodies of comparatively large depth. However, this considerable depth or height of the link-bodies is not a necessity and not dictated by the technical means used for the coupling and uncoupling of the links, but may be regarded as a concession to the fashionable trend of the present. The bail-like springs 3, 4, 19, constituting the technical means of the coupling mechanism, require for their arrangement a hollow body of very small depth, which, if the thickness of the spring is 0.6 mm. has to be only about 1.15 mm. or the like. That is why the possibilities of shaping the links do not range within small limits. The links of the various modifications, and the sizes of the springs which seat therein are of corresponding size so that the link body acts as a fixed abutment for resisting releasing movement of the spring ends from the link holes.

The strip bodies of the first three forms of construction consist of links which are all of the same shape and require for their manufacture only one single die and appertaining stamp for all of the links. However, the invention is not confined to one shape of links only. The strip-bodies illustrated in Figs. 10 and 11 are made up of two different shapes of links, which in the form of invention of Fig. 10 consist in alternate succession of links provided at both ends with only one single tooth 23, and of links having at each of their ends two teeth 24, from which extend through two pairs of holes in that two pairs of teeth the two pairs of fastening members 25 in order to engage in the two pairs of holes of the single teeth 23 of the two adjacent links. In the strip-body shown in Fig. 11 the links are provided with interlocking rows of teeth 26 and 27 coupled together, according to the number of their teeth, by means of a plurality of for instance two pairs of fastening members 28, 28 and 29, 29, formed by bail-like springs extending each of them over a plurality, for instance two teeth 27. It will be noticed that the strip-body of Fig. 11 is made up of two different types of links. But it is also possible to make all of the links of the same shape, in which case each link will be provided with two different rows of teeth, viz. at one side with a row of teeth 26, and at the other side with a row of teeth 27, so that the row of teeth 27 at one side of the link can engage in the recesses between the row of teeth 26 of the adjacent link.

What I claim as new and desire to secure by Letters Patent of the United States is:

A flexible band comprising a series of hollow links pivotally connected in end to end relation, each link having two spaced hollow elements at one end thereof providing a recess therebetween, and a hollow projection at the other end seated in the recess of the next link, the outer side walls of the hollow projection and the contiguous inner side walls of the recess having aligned openings, and a U-shaped spring in each link having a curved body portion with flexible arms, the link having a fixed abutment for the spring body portion and the spring arms having lateral pivot fingers extending inwardly through the aligned openings in the outer side walls of the projection and the contiguous inner side walls of the recess, whereby separating movement of the pivot fingers from their associated openings is resisted by flexing of the spring body portion against the link abutment.

References Cited in the file of this patent

UNITED STATES PATENTS

| | | |
|---|---|---|
| 1,224,585 | Ware | May 1, 1917 |
| 1,271,041 | King | July 2, 1918 |
| 1,526,136 | Goozey | Feb. 10, 1925 |
| 1,603,385 | Gammell et al. | Oct. 19, 1926 |
| 1,669,710 | Jones | May 15, 1928 |
| 1,753,971 | Roy | Apr. 8, 1930 |
| 2,417,289 | Bisso et al. | Mar. 11, 1947 |
| 2,518,163 | Megar | Aug. 8, 1950 |

FOREIGN PATENTS

| | | |
|---|---|---|
| 6,173 | Great Britain | Mar. 13, 1902 |
| 15,129 | Great Britain | July 22, 1905 |